(12) United States Patent
Malomsoky et al.

(10) Patent No.: US 7,675,948 B2
(45) Date of Patent: Mar. 9, 2010

(54) PERFORMANCE ANALYSIS OF A CIRCUIT SWITCHED MOBILE TELECOMMUNICATIONS NETWORK

(75) Inventors: Szabolcs Malomsoky, Szentendre (HU); Szilveszter Nadas, Budapest (HU); Laszlo Rozgonyi, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 173 days.

(21) Appl. No.: 11/720,230

(22) PCT Filed: Nov. 26, 2004

(86) PCT No.: PCT/SE2004/001754

§ 371 (c)(1),
(2), (4) Date: Oct. 20, 2007

(87) PCT Pub. No.: WO2006/057586

PCT Pub. Date: Jun. 1, 2006

(65) Prior Publication Data

US 2009/0003227 A1    Jan. 1, 2009

(51) Int. Cl.
*H04J 3/04* (2006.01)
(52) U.S. Cl. .................................... 370/536; 370/389
(58) Field of Classification Search ......... 370/352–358, 370/252, 536, 345, 389, 493, 494, 495
See application file for complete search history.

(56) References Cited

U.S. PATENT DOCUMENTS

2003/0100299 A1   5/2003  Ko et al.
2004/0266442 A1*  12/2004 Flanagan et al. ............ 455/445
2005/0216831 A1*  9/2005  Guzik et al. ................. 715/513
2007/0070969 A1*  3/2007  Malomsoky et al. ......... 370/345

OTHER PUBLICATIONS

Anonymous: "Dilithium Network Analyzer, DNW-DNA Version 2.1" Dilithium Networks—Data Sheet, 'Online! Jun. 20, 2003, pp. 1-7. XP002338492 Retrieved from Internet: URL: http://web.archive.org/web/20030620033139/www.dilithiumnetworks.com/images/pdf/DNA+datasheet.pdf>.
Anonymous: "The 3G-324M/H.324M Interoperability Challenge" Dilithium Networks—White Paper, 'Online! Aug. 2004, pp. 1-16, XP002338491 Retrieved from the Internet: URL:http://www.dilithiumnetworks.com/images/pdf/3G-324MInteropWhitePaper.pdf>.

* cited by examiner

*Primary Examiner*—Brenda Pham (57) ABSTRACT

In a circuit switched mobile telecommunications network a performance analysis is provided. In accordance with the invention a method is implemented, which can be carried out both OFF-LINE and ON-LINE, wherein transport channels carrying the circuit switched traffic of a service are found, then bit-streams of the circuit switched traffic are demultiplexed. A traffic database is built and a set of Key Performance Indicators and usage measures characterizing the service are defined and calculated. A passive traffic monitor is also disclosed, which is attached to a standardized interface of the circuit switched mobile telecommunications network consisting of mobile terminals, radio access network and core network. The passive traffic monitor comprises a trace analyzer connected to a signaling analyzer, to a user plane protocol analyzer and to a traffic database writer. The traffic database writer generating a traffic database is linked to the signaling analyzer, to the trace analyzer and to the user plane analyzer.

24 Claims, 8 Drawing Sheets

PERFORMANCE ANALYSIS OF A CIRCUIT SWITCHED MOBILE TELECOMMUNICATIONS NETWORK

BACKGROUND OF THE INVENTION

1. Technical Field of the Invention

The invention relates in general to performance analysis of a circuit switched mobile telecommunications network. In particular, and not by way of limitation, the present invention is directed to large-scale performance analysis of 3G-324M-based Video Telephony and circuit switched streaming.

2. Description of Related Art

When introducing Video Telephony in to the Third Generation (3G) systems, instead of embracing "next generation" Internet Protocol (IP) for conversational multimedia, the high Quality of Service (QoS) and mature signaling of "old generation" Time Division Multiplexing (TDM) are used and a circuit switched communication channel is established between mobile peers. The Third Generation Partnership Program (3GPP) standard body is responsible for the Universal Mobile Telecommunications System Wideband Code-Division Multiple Access (UMTS/WCDMA) specifications. 3GPP defined specifically the structure and implementation requirements of circuit switched Video Telephony in the 3G-324M standard.

The 3GPP2 standard body, responsible for CDMA2000 specifications, in August 2002 approved a similar technical specification for 3G-324M operation requirements over CDMA2000 networks—named "3GPP2 C.S0042 for circuit switched Video Conferencing Services."

3G-324M is currently in operation in a number of live UMTS/WCDMA networks, e.g., 3G networks operated by companies J-Phone and NTT DoCoMo in Japan.

3G-324M is a derivative of standard H.324, which is an ITU-T Recommendation of Terminal 1 for low bit rate multimedia communication, and was developed for an analog public network connection, and for V.34 modems. As a baseline of the terminal specification, standard H.324M was adopted as a mobile extension, with bit error handling procedures to support the delivery of delay-sensitive applications, e.g. video streaming and videoconferencing, over 3G networks. The protocol does not handle addressing but comes into play only after a call setup using Integrated Services User Part (ISUP) logical procedure and addressing methods according to standard E.164 over underlying 3G wireless protocol, e.g. WCDMA. In that stage the called peer is located and the call is set up between the two call peers, establishing a circuit switched channel between them. When that circuit switched channel is operating, the 3G-324M is initiated to synchronize the multiplexing-demultiplexing operation between parties and to start the call control operation according to standard H.245, which is an ITU-T Recommendation of control protocol for multimedia communication.

Figure 1:
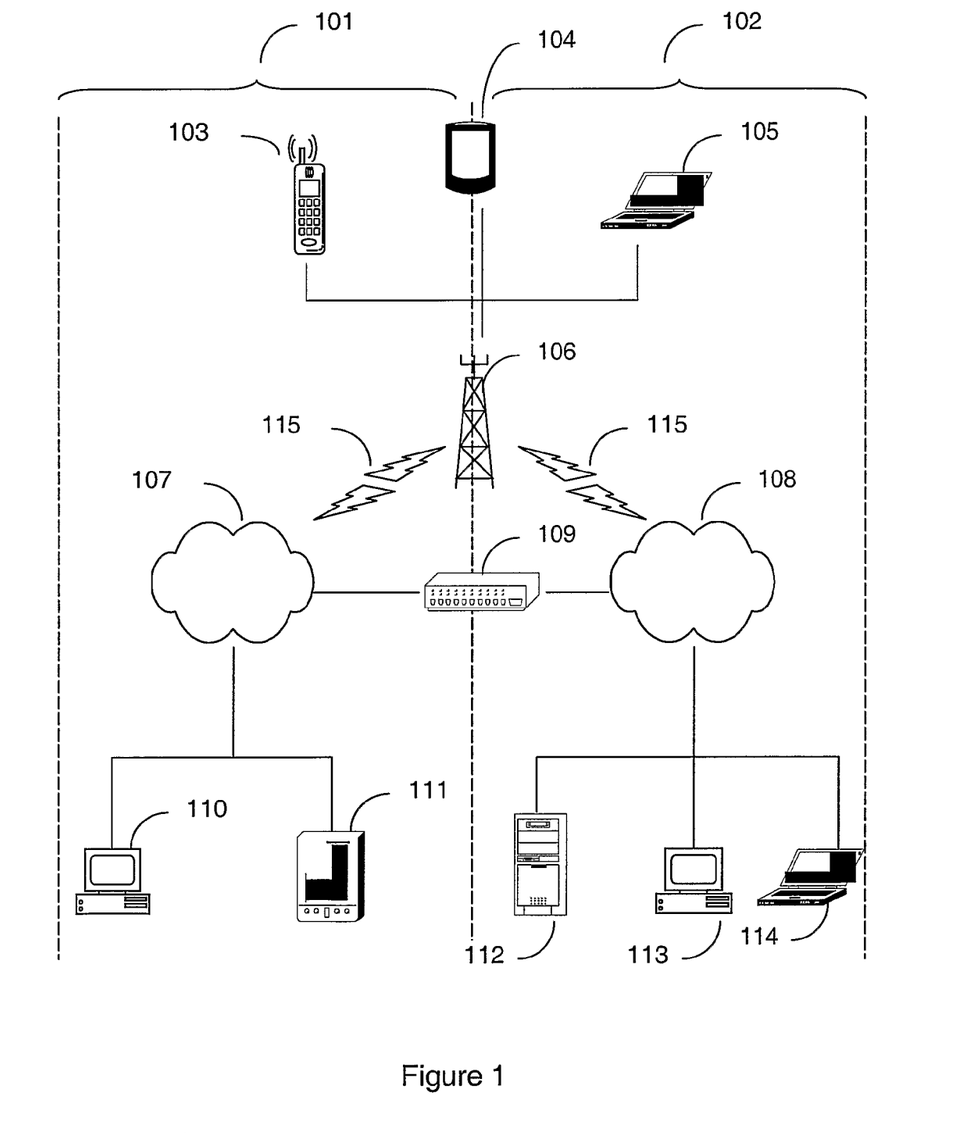
FIG. 1 is an embodiment of a 3G network using the 3G-324M protocols for circuit switched transmission.

In FIG. 1 a possible embodiment of a 3G network is shown, a part of which belongs to circuit switched domain 101, while the other part belongs to packet switched domain 102. The network includes mobile terminals 103, 104, 105 using the 3G-324M protocols for real-time multimedia delivery; H.324 terminals 110 and H.320 terminals 111 connected to a sub-network 107 of delay-sensitive applications like video or voice transmission; and video streaming and Content Servers 112, Common Internet Applications 113 and H.323/SIP terminals 114 connected to another sub-network 108 of delay-tolerant applications like e-mail or web. A gateway 109 is applied to connect the two domains 101, 102, and a base station system 106 to establish radio link 115 among the sub-networks 107, 108 and the mobile terminals 103, 104, 105.

Figure 2:
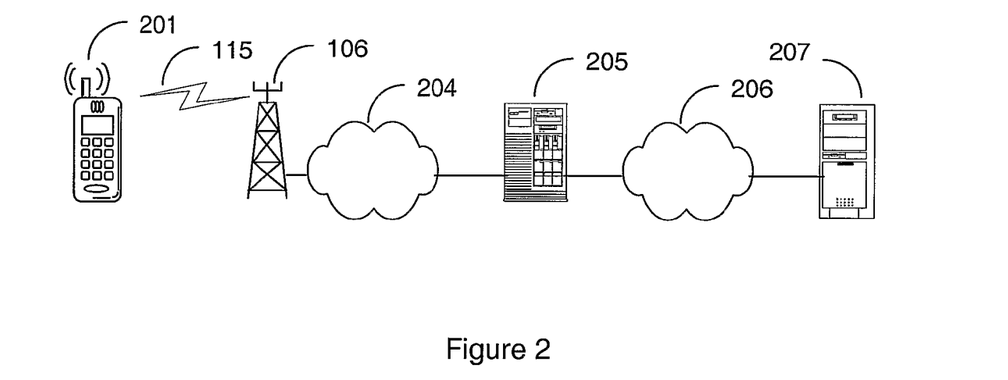
FIG. 2 illustrates a block diagram of streaming based on 3G-324M protocols.

Another scenario, where 3G-324M is used is circuit switched streaming illustrated in FIG. 2. In this scenario, the mobile terminal 201, e.g. 3G videophone is connected to a Video Gateway 205 through radio link 115, base station system 106 and an access network 204 using 3G-324M. The Video Gateway 205 communicates with a content server 207 using the packet switched streaming solution over the packet switched core network 206. In this solution, the streaming contents are addressed through E.164 numbers dialed from the mobile terminal 201. The user dials a service number, watches the content, and hangs up when finished. The control of the video playing is supported using Dual Tone Multiple Frequency (DTMF): for example rewind 5 sec for each press on a key, pause/play, forward 5 sec for each press on a key. Typically no transcoding of video and audio codecs is performed in the Video Gateway. Audio and video codecs according to standards AMR, H.263 and MPEG-4 are supported end-to-end.

In order to be sure that a terminal is interoperable with another one, a reference terminal is needed that can be used for conformance testing purposes. This interoperability testing capability was the primary goal when the Dilithium Networks Analyzer (DNA)(Dilithium Networks Analyzer, DNW-DNA Version 2.2, LIT # 0703v3.9) was developed.

Besides Interoperability testing, this terminal is good for performance analysis, because it behaves as ordinary terminal, but also makes certain measurements on different levels of the protocol stack.

The non-intrusive network traffic monitoring option of this tool provides facilities for monitoring 3G-324M network traffic in an OFF-LINE or ON-LINE fashion. For example, it can monitor the 3G-324M data from the two end-points engaged in a call. The two end-points may be either handsets or a combination of a handset and a multimedia gateway. Applications are interoperability testing, troubleshooting, and service optimization.

In the OFF-LINE mode, DNA can be use to passively capture the data to a file. The DNA can then be used to play these data to inspect the command and control channel, and display video and play audio channels. In the ON-LINE mode, DNA (with the option) can be configured to passively monitor and intercept H.324M/3G-324M bit-streams on the bearer channel, decode the bit-stream, inspect the command and control channel, and to visualize and listen to the video and voice channels. The quality of the service can be inspected in terms of video and voice bit-rates, video framerate, and the error rate from the multiplexer. The voice and video data can be saved to file and further analysis of the data using more specialized voice and video analysis tools can be performed if needed.

Besides the above mentioned analyzer tool, there are certain performance counters implemented in network nodes, which can be used to trace performance problems. These counters are not dedicated for specific services, but rather for the UMTS system.

The existing solutions such as DNA, cannot be used to answer certain questions, which arise at network operators: E.g. To what extent is my network used for Video Telephony? Or: What are the characteristics of the call traffic? Or: How many calls could not be set up and why? Or: Was the quality of the successful calls satisfactory? In other words, there exists no tool for analyzing large amount of videophone traffic, and therefore statistical measures on the usage and quality of the service in a live network is rather difficult to determine convincingly.

There are several problems with the counters as well: The counters are typically not service-specific, but system specific devices. It means that service-specific statistical data cannot be obtained. Counters do not work on all protocol elements. For example in case of Video Telephony the analysis should involve a lot of control plane signaling protocols, and the different logical channels within the H.223 multiplex, where H.223 protocol is a ITU-T Recommendation of multiplexing protocol for low bit rate multimedia communication. To obtain certain measures all of these protocol levels are needed, for example the time between call initiation and the time when the first video frame arrives. Moreover, different vendors implement different counters, and it makes it impossible to build a coherent performance monitoring system in a multivendor network. Finally, the node resources for this purpose are limited. In general, significant hardware/software resources are needed for measuring Key Performance Indicators, which can increase the costs of network elements. A further consequence of the fact that the resources available for counter-based performance analysis are limited is that the time resolution of these counters is coarse.

We have set ourselves the objective with this invention to improve the solutions described above by implementing a performance analysis of a circuit switched mobile telecommunications network especially for large-scale measurement of 3G-324M Video Telephony and circuit switched streaming.

SUMMARY OF THE INVENTION

Accordingly, it is the object of the invention to provide a method for performance analysis of circuit switched mobile telecommunications networks wherein a passive traffic monitor is connected to a standardized interface of the network. The object can be attained by finding transport channels carrying the circuit switched traffic of an analyzed service, demultiplexing bit-streams of the circuit switched traffic, building a traffic database and defining and calculating Key Performance Indicators and usage measures characterizing the service.

In another aspect, the present invention is directed to a passive traffic monitor for performance analysis of a circuit switched mobile telecommunications network especially for a large-scale performance analysis of 3G-324M-based Video Telephony, wherein the passive traffic monitor is attached to a standardized interface of the circuit switched mobile telecommunications network consisting of mobile terminals, radio access network and core network. In accordance with the present invention the passive traffic monitor comprises a trace analyzer connected to a signaling analyzer, to a user plane protocol analyzer and to a traffic database writer. The traffic database writer generating a traffic database is linked to the signaling analyzer, to the trace analyzer and to the user plane analyzer.

The most important advantage of the invention is that it enables large-scale measurement of 3G-324M-based Video Telephony and circuit switched streaming.

It is also advantageous that it makes possible on-line measurement of a large amount of videophone calls.

Another advantage is that it deduces end user perceived performance and certain network problems from the Key Performance Indicators.

A further advantage is that the passive traffic monitor according to the invention, which monitors the usage and usage characteristics of the Video Telephony and circuit switched streaming services can be connected to a single point of the 3G network, preferably to the Iu interface. It is service-specific, and works on all protocol elements involved in creating the service. Since it is independent of the UMTS system, it is possible to build a coherent performance monitoring system in a multivendor network.

BRIEF DESCRIPTION OF THE DRAWINGS

For a more complete understanding of the invention, reference is made to the following detailed description taken in conjunction with the accompanying drawings wherein.

DETAILED DESCRIPTION OF THE INVENTION

Figure 3:
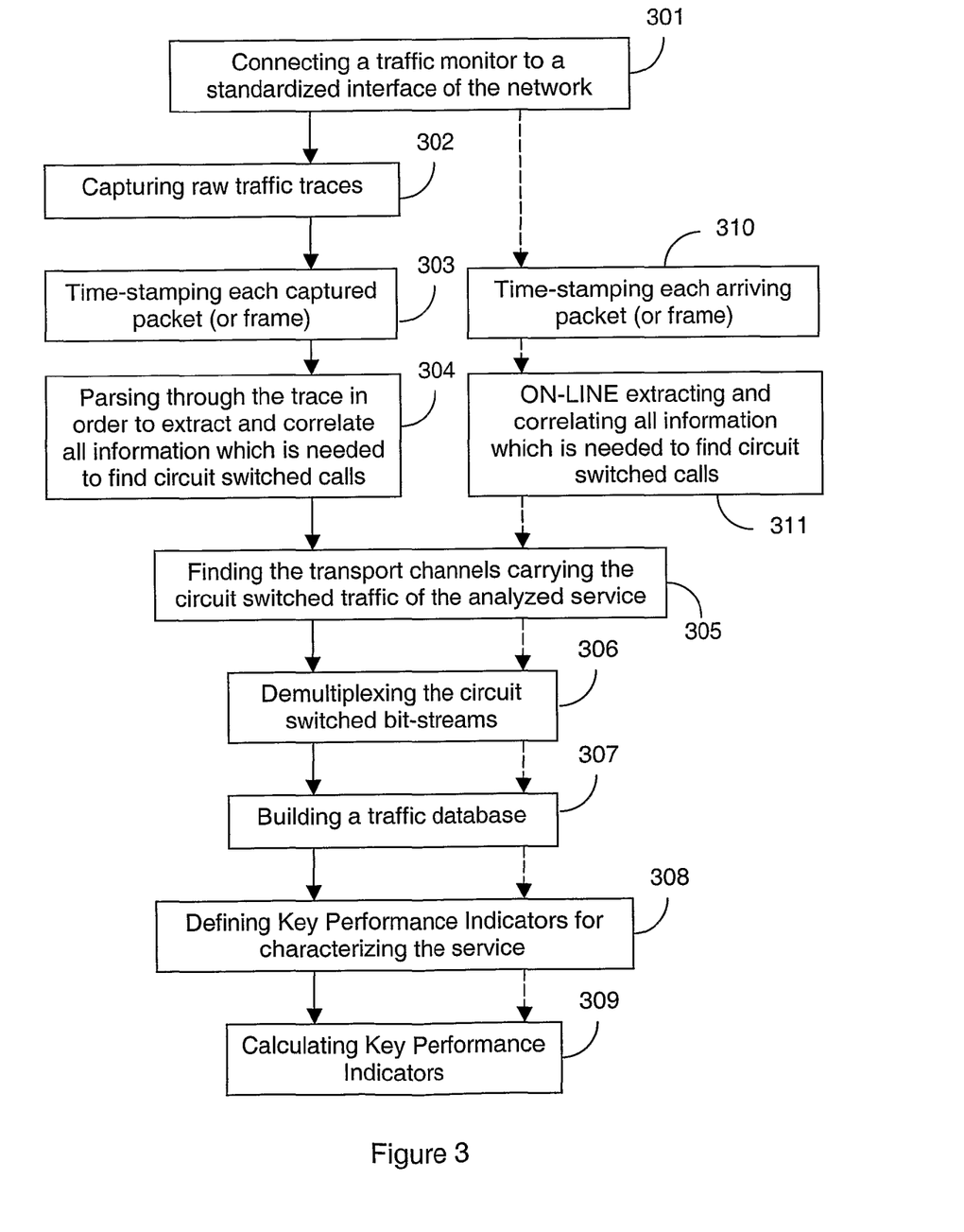
FIG. 3 shows the flowchart of the method performing large-scale analysis of a circuit switched mobile network.

In FIG. 3, the steps of the method performing large-scale analysis of a circuit switched mobile network are illustrated for both ON-LINE and OFF-LINE cases. Steps shown in the left side and linked by solid arrows belong to the OFF-LINE case, while steps depicted on the right side and connected by dashed arrows refer to the ON-LINE case.

As a first step 301, a traffic monitor is connected to a standardized interface of the network in both cases. This standardized interface is preferable the Iu interface of a 3G network. In the second step 302, in OFF-LINE case, raw traffic traces are captured over the interface mentioned before. Each captured packet or frame is provided with a time-stamp 303. Then in step 304, the traces are parsed through in order to extract and correlate all information which is needed to find circuit switched calls. In ON-LINE case, each arriving packet (or frame) is time-stamped 310, and all information needed to find circuit switched calls are extracted and correlated ON-LINE 311. From now on, for both cases the steps of the processing are the same: The transport channels carrying the circuit switched traffic are found 305. Then the bit-streams of the circuit switched traffic are demultiplexed 306, and a traffic database is built 307. Finally, Key Performance Indicators and usage measures for characterizing the service is defined 308 and calculated 309.

Figure 4:
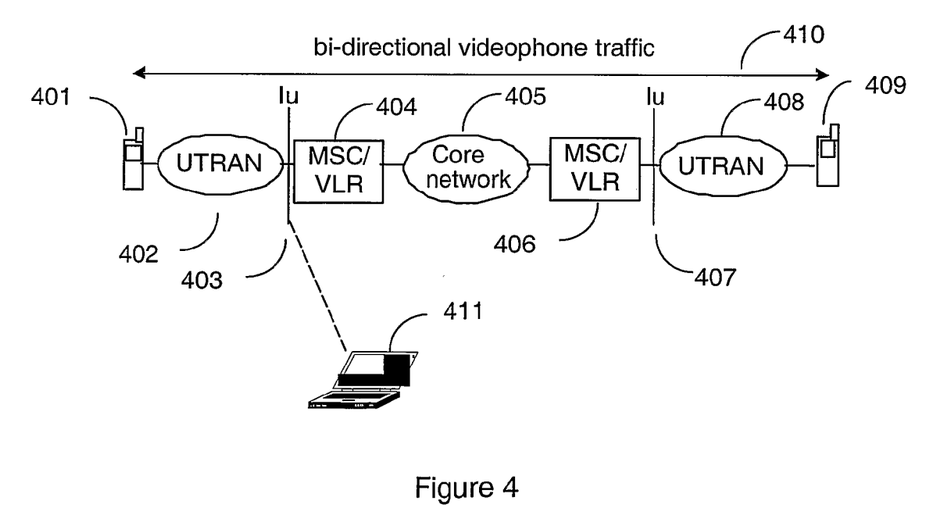
FIG. 4 depicts block diagram of the videophone service scenario.

In FIG. 4, a bi-directional videophone traffic 410 initiated between mobile terminals 401, 409 is illustrated. When doing passive measurements, we need to consider where the passive traffic monitor 411 should be located within the network and what type of information should be extracted in order to explore system performance. Although it is not the only possibility, but it is advantageous to connect the passive traffic monitor 411 to any of the Iu interfaces 403, 407 between Mobile Switching Center (MSC)/Visitor Location register (VLR) 404, 406 and Radio Network Controller (RNC) of an UMTS Terrestrial Radio Access Network (UTRAN) 402, 408. This way it is ensured that all Video Telephony calls of an RNC are tracked, and thus it is possible to observe a large amount of traffic. On the other hand, the Key Performance Indicators can be detailed such that also UTRAN-related problems can be observed, because it is the Iu interface 403, 407 where the Core network 405 asks for the services of the UTRAN Access Stratum.

Figure 5:
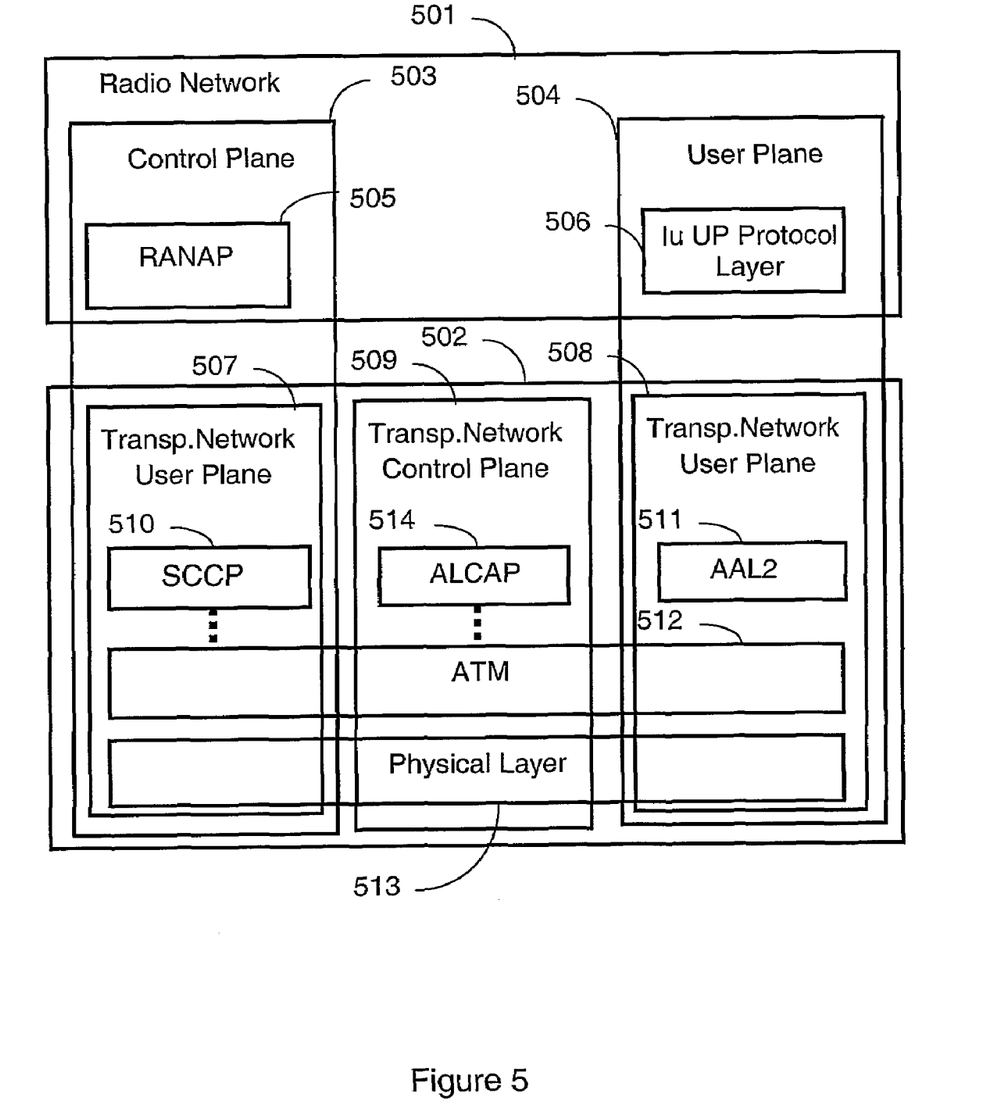
FIG. 5 delineates possible embodiment of Iu Interface Protocol Structure towards circuit switched domain.

In FIG. 5, the ATM-based protocol structure of the Iu interface towards the circuit switched domain is depicted. Since the Iu interface is the most reasonable choice, from now on detailed description will be focused on how the method works for this interface. The model can be split up into two logically independent layers: Radio Network Layer (RNL) 501 and Transport Network Layer (TNL) 502, and orthogonally into Control Plane 503 and User Plane 504. The Control Plane 503 is used to control a link or a connection and the User Plane 504 is used to transparently transmit user data from the higher layers. According to the current specifications the TNL 502, the User Plane 504 and TNL Control Plane 509 is based on Asynchronous Transfer Mode (ATM) technology 512.

The Control Plane 503 involves Radio Access Network Application Part (RANAP) Protocol 505 used to provide UMTS specific signaling and control over the Iu interface. The User Plane 504 involves Iu User Plane Protocol Layer 506 containing the user data that are transparently transmitted between the network elements. The TNL 502 is also divided in to a control and a user plane: the Transport Network Control Plane 509 and the Transport Network User Plane (TNUP) 507 and 508, respectively. Considering TNUP, entities 507 and 508 are distinguished based on what type of information (i.e., Control Plane 503 messages or User Plane 504 packets) is transported.

RANAP 505 and higher layer messages of a user are transported over Signaling Connection Control Part (SCCP) 510 connections. The ATM Adaptation Layer 2 (AAL2) 511 is used to transmit User Plane 504 data in the transport network. AAL2 connections are established using ALCAP 514. The ATM layer 512 and the Physical Layer 513 provide common transport means for the Planes 507, 508, 509.

Over the Iu interface, call control and mobility management messages (this is L3 mobile—MSC communication) are transported over the RANAP 505, which is transported over an SCCP 510 signaling connection. The videophone bit-stream is transferred over the Transport Network User Plane 508 using the AAL2 protocol 511. Since we want to capture the bit-stream, we need to find the relation between call control, RANAP 505, SCCP 510 and AAL2 511. If IP is used instead of ATM/AAL2, the method works similarly, just the transport network identifier is not an AAL2 Connection Identifier (CID), but the respective identifier in the IP-based transport network.

Figure 6:
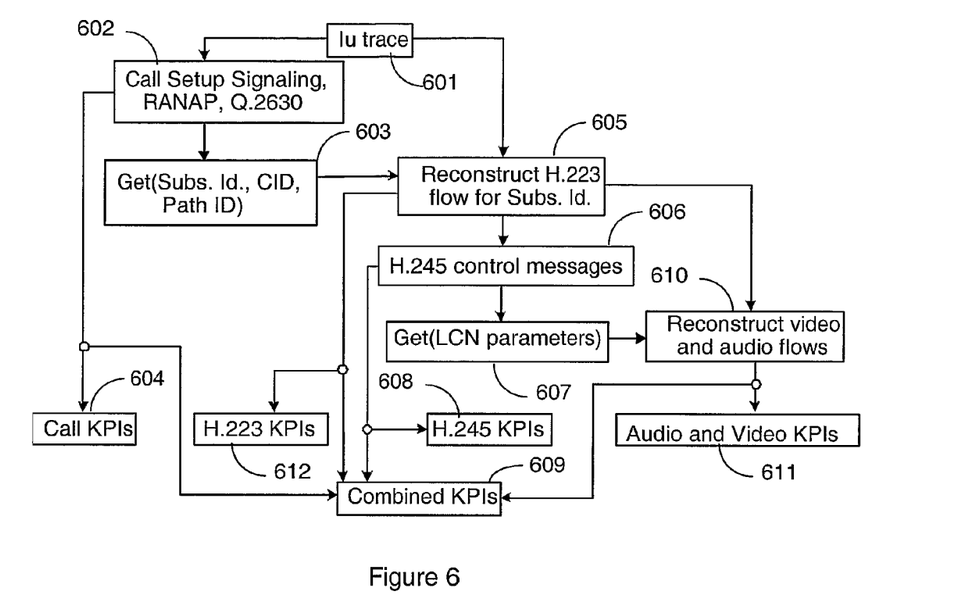
FIG. 6 schematizes flow chart of the method according to the invention in case of having an Iu trace.

In FIG. 6, the flow chart of the method according to the invention in case of having an Iu trace 601 is shown. Once call setup signaling messages 602 corresponding to a videophone call are identified, transport network level identifiers (CID, AAL2 Path Identifier) of the connection carrying the videophone traffic of the respective subscriber are obtained 603 (Get(Subs. Id., CID, Path ID)). Next, by knowing the CID and the Path ID, it is possible to demultiplex the transport network connection and reconstruct a H.223 flow 605, which is a bit-stream that multiplexes 606 the video and voice frames, and H.245 control messages into one flow. After that, the parameters of logical channels (LCN) carrying the video and voice components are obtained by interpreting 607 (Get(LCN parameters)) the H.245 control messages. Once we have the LCN parameters, it is possible to reconstruct 610 the video and audio flows.

During the processing Key Performance Indicators are calculated. Depending on what information is needed to obtain a Key Performance Indicator, we distinguish Call Key Performance Indicators 604, H.223 Key Performance Indicators 612, H.245 Key Performance Indicators 608, Audio and Video Key Performance Indicators 611, as well as Combined Key Performance Indicators 609, where information elements from call setup signaling as well as from H.223, H.245 and the Audio and Video frames may be needed to derive the Key Performance Indicator value. Examples of the Key Performance Indicators that are possible to derive will be presented later in the description.

Figure 7:
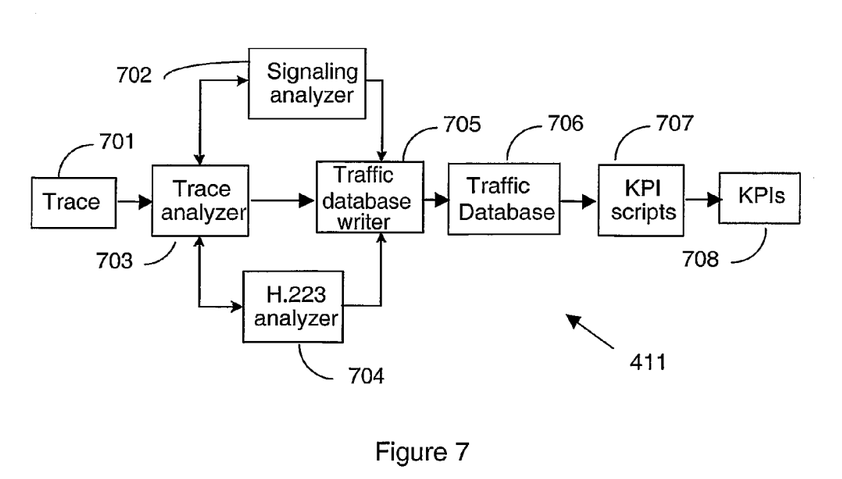
FIG. 7 shows block diagram of a possible embodiment of a passive traffic monitor.

In FIG. 7, a possible embodiment of the passive traffic monitor 411 that implements this method is shown. The passive traffic monitor 411 comprises a trace analyzer 703 connected to a signaling analyzer 702, to a user plane protocol analyzer preferable a H.223 analyzer 704 and to a traffic database writer 705. The traffic database writer 705 generating a traffic database 706 is linked to the signaling analyzer 702, to the trace analyzer 703 and to the H.223 analyzer 704. The functions of these modules are the following:

The trace analyzer 703 controls the trace parsing process during the analysis. If it detects the arrival of a signaling message, it passes this message to the signaling analyzer 702 for processing. It asks the signaling analyzer 702 for the identifiers of arriving calls, and based on this information it triggers the H.223 analyzer 704 to start the analysis of the H.223 multiplex carried within arrived calls.

The signaling analyzer 702 checks the signaling messages within a trace 701, and collects information that is needed to identify arriving videophone calls. It passes the newly detected [Subscriber ID, CID, Path ID] triplet to the trace analyzer 703. Information to be logged is sent to the traffic database writer 705; e.g., when calls arrived, when calls were terminated and how, were there calls rejected and why.

The H.223 analyzer 704 processes and parses the H.223 bit-streams identified by the trace analyzer 703 with the help of the signaling analyzer 702. Information elements that are needed for the analysis are identified and the measures that are needed for the calculation of Key Performance Indicators are collected and sent to the traffic database writer 705. The H.223 analyzer 704 informs the trace analyzer 703 if it finds the videophone call being terminated.

The traffic database writer 705 organizes the information received from the analyzer modules 702, 703, 704 into the traffic database 706, which is stored in a log file using a pre-defined format.

Key Performance Indicator scripts 707 take the traffic database 706 as input and calculate Key Performance Indicators 708.

Figure 8:
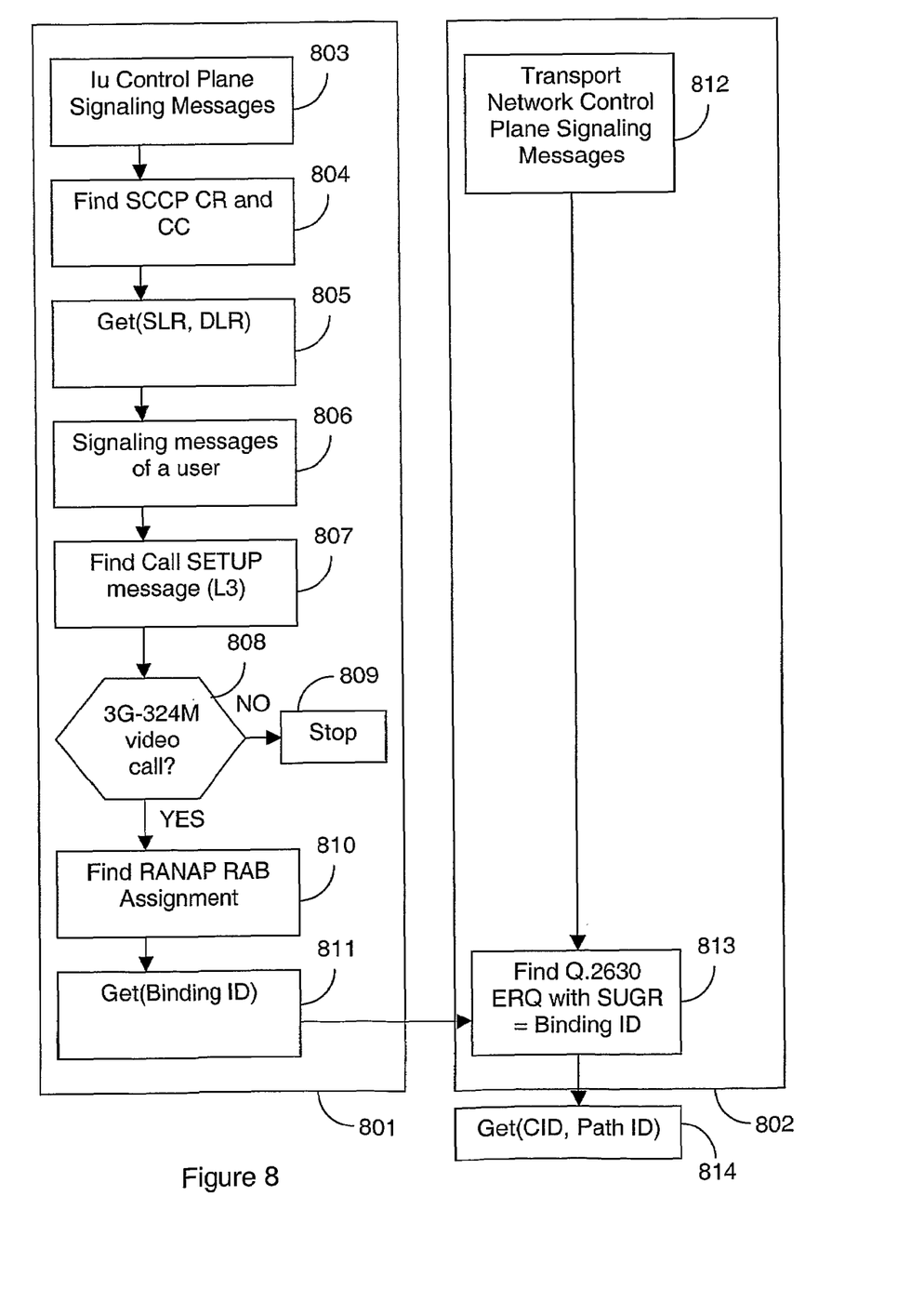
FIG. 8 is flow chart showing a possible operation for the signaling analyzer of the passive traffic monitor.

In FIG. 8, a method of obtaining the CID and the Path ID in the Control Plane 801 and Transport Network Control Plane 802 for an arriving call is depicted. First the SCCP Connection Request (CR) and Connection Confirm (CC) messages are found from Iu Control Plane Signaling Messages 803 in step 804, and the signaling connection identifiers Destination Local Reference (DLR) and Source Local Reference (SLR) are obtained in step 805. These two identifiers together identify the signaling connection that carries all Control Plane signaling messages 806 (but not Transport Network Control Plane 812) in connection with a call.

Next, the Layer 3 (L3) call SETUP message is found in step 807, which contains the information whether the arriving call is "H.223 & H.245" or not. If it turns out that the call is a videophone call (3G-324M) in step 808, then the RANAP RAB Assignment message is looked for in step 810, which, among other important information, contains the Binding ID 811, otherwise the process is stopped in step 809. Since the Binding ID 811 is also carried in the Q.2630 Establishment Request (ERQ) message, in the Served User Generated Reference (SUGR) information element 813, the AAL2 connection setup messages (ERQ, ECF, etc.) corresponding to this call setup can be identified. The ERQ message also contains the AAL2 CID and the Path ID, and thus the transport connection that carries the user plane traffic (the H.223 multiplex) is identified in step 814. The association of Virtual Path Identifier/Virtual Channel Identifier (VPI/VCI) and the Path ID happens in configuration time-scale. Therefore it is assumed that this association is given to the method as input.

Figure 9:
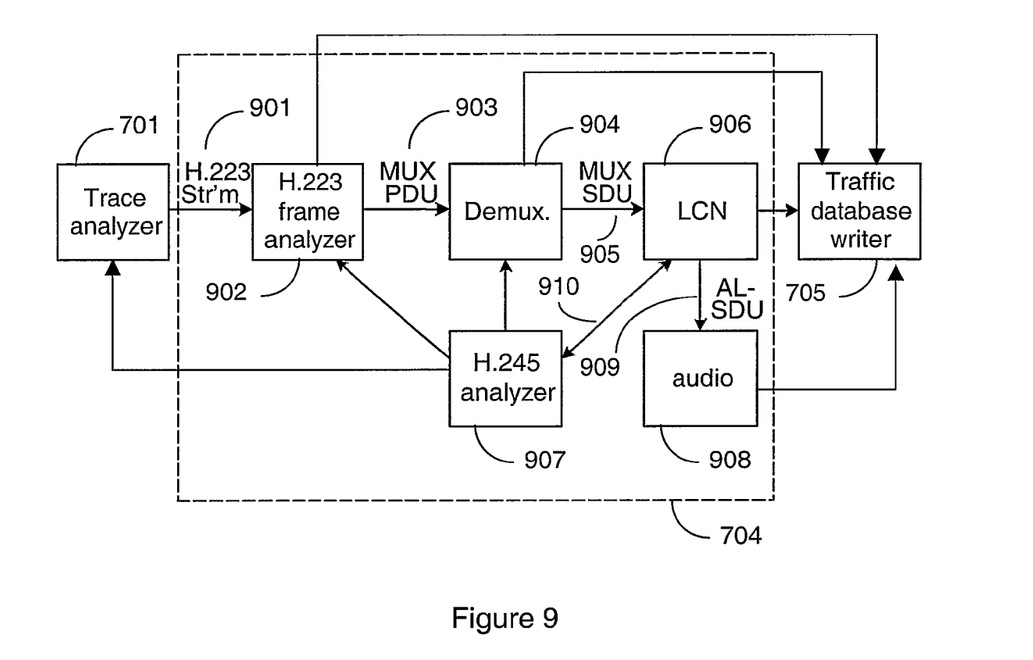
FIG. 9 illustrates a possible embodiment of a H.223 analyzer.

In FIG. 9, the internal structure of a H.223 analyzer 704 is shown. A H.223 frame analyzer 902 gets H.223 stream 901 from a trace analyzer 701. It identifies the H.223 frames within the stream and reconstructs the Multiplex Protocol Data Units (MUX-PDUs) 903, which may contain octets from multiple logical channels (LCN). A MUX-PDU header 903 describes the contents of the multiplex packet. A demultiplexer 904 reconstructs Multiplex Service Data Units (MUX-SDUs) 905, which always contain an integral number of octets that belong to a single logical channel. An LCN module 906 is able to interpret the Adaptation Layer (AL) PDUs 909 which are in turn the MUX-SDUs 905, and it reconstructs the AL SDUs 909. The contents of the AL SDUs 909 may than be further processed by audio or video module 908, depending on what type of logical channel they belong to.

The H.223 frame analyzer 902, the demultiplexer 904 and the LCN module 906 are (partially) controlled by a H245 analyzer 907. This module gets the H.245 control messages 910 from LCN in form of AL1-SDUs. AL1 is designed primarily for the transfer of data or control information. H.245 is transferred in the first logical channel (LCN0) in the H.223 multiplex. The control channel shall be considered to be permanently open from the establishment of digital communication until the termination of digital communication; the normal procedures for opening and closing logical channels shall not apply to the control channel. By default, H.245 works over AL1 and it also requires the Numbered Simple Retransmission Protocol (NSRP) and Control Channel Segmentation and Reassembly Layer (CCSRL) sublayer support to ensure reliable operation.

The H.245 control protocol provides following functionalities and services:

Master-slave determination is provided to determine which terminal is the master at the beginning of the session. Due to the fact that H.245 is symmetric control protocol, it is necessary to decide the master terminal, which has the right to decide the conditions in case of conflict.

Capability exchange is provided to exchange the capabilities both terminal supports, such as optional modes of multiplexing, type of audio/video codecs, data sharing mode and its related parameters, and/or other additional optional features.

Logical channel signaling is provided to open/close the logical channels for media transmission. This procedure also includes parameter exchange for the use of this logical channel.

Multiplex table initialization/modification is provided to add/delete the multiplex table entries. Multiplex table entries are referenced from the header of the MUX-PDUs, and describe the logical channel to which each octet in the information field of a MUX-PDU belongs.

Mode request is provided to request the mode of operation from the receiver side to the transmitter side. In H.245, the choice of codecs and its parameters are decided at the transmitter side considering decoder's capability, so if the receiver side has a preference within its capability, this procedure is used.

Round-trip delay measurement is provided to enable the determination of the round trip delay between two communicating terminals. A RoundTripDelayRequest message is sent to the terminal on the other end, and a timer is started. If a RoundTripDelayResponse message is received in response to the RoundTripDelayRequest message then the timer is stopped and the user is informed about the round trip delay, which is the value of the timer.

Loopback testing is provided for use during development or in the field to assure proper operation.

Miscellaneous call control commands and indications are provided to request the modes of communication, flow control such as conference commands, jitter indication and skew, or to indicate the conditions of the terminal, to the other side.

Figure 10:
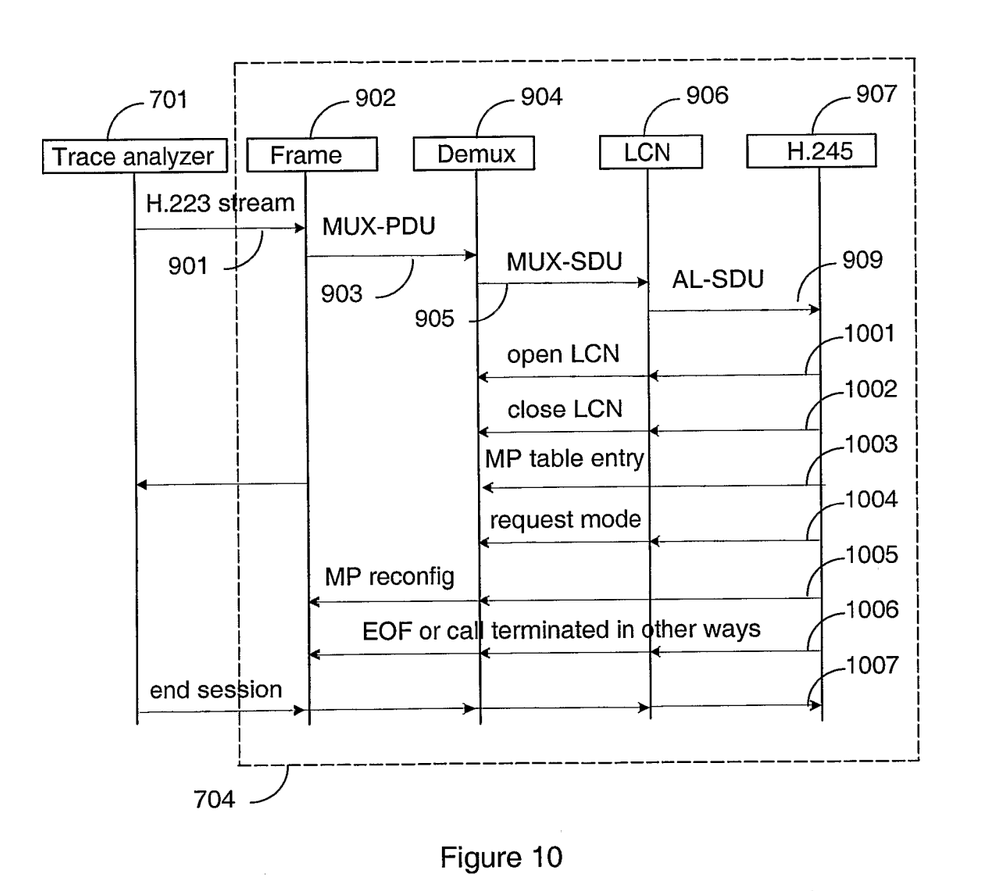
FIG. 10 depicts sequence diagram of the interaction among the modules of the H.223 analyzer.

In FIG. 10, the interaction among the modules of the H.223 analyzer 704 is shown. The H.245 analyzer 907 informs the demultiplexer 904 about the logical channels that are opened 1001 or closed 1002. It also provides information on the used multiplex table entries 1003 and the mode of operation 1004. This way the demultiplexer 904 and the LCN module 906 know how to interpret the MUX-PDUs 903 and MUX-SDUs 905, respectively.

The H.245 analyzer 907 informs also the H.223 frame analyzer 902 if during the transmission the H.223 multiplex is reconfigured 1005, for example Level 2 options are modified, which effects already the way H.223 frames should be reconstructed.

If the H.245 analyzer 907 finds the End Session message 1007, then it informs the other modules about this. If the call is terminated 1006 because the end of the trace was reached, or in other ways not recognized by the H.245 analyzer 907, then the trace analyzer 701 informs the modules of the H.223 analyzer about that.

The performance indicators and usage measures described in the followings are examples that may be used to characterize the Video Telephony service in 3G networks. These measures can all be obtained using the passive traffic monitor; the Key Performance Indicator scripts are used to calculate the Key Performance Indicators from the traffic database.

Service Set-Up Success Rate Video Telephony: The number of 3G-324M successful Video Telephony call setups divided by the number of all 3G-324M Video Telephony call setups. A 3G-324 call setup is successful if the call setup messages contain a valid Layer 3 SETUP and a L3 CONNECT and a L3 CONNECT ACK. message, and the AAL2 connection setup is successful (seen from ERQ and ECF messages), and at least one valid video frame is seen in both directions (from both parties) of the Video Telephony call.

Dropped Video Telephony Call Rate: The number 3G-324M Video Telephony calls that are successfully set up but did not finish properly (there was no normal termination message in one or more protocol levels) divided by the number of 3G-324M Video Telephony calls that are successfully set up. A call finishes properly, if all logical channels that carry video or audio frames are closed and valid AAL2 connection release and L3 call termination messages are seen.

Service Access Time: The average time between the SCCP CR and the appearance of the first video frame within the H.223 bit-stream calculated for 3G-324M Video Telephony calls that are successfully set up.

Corrected Service Access Time: The average of the time between the SCCP CR and the appearance of the first video frame within the H.223 bit-stream minus the time between the L3 ALERTING and L3 CONNECT messages, calculated for 3G-324M Video Telephony calls that are successfully set up. The time between the ALERTING and CONNECT messages approximates the time between the called party hearing the ring tone and picking up the phone. This way the 'Corrected Service Access Time' characterizes the system better than the 'Service Access Time'.

Channel Setup Time: The average time elapsed from the arrival of the first H.223 frame until the arrival of the first video frame for 3G-324M Video Telephony calls that are successfully set up.

H.223 MUX Overhead: The percent of redundant octets (non payload) within the H.223 multiplex. This contains the header and Cyclic Redundancy Code (CRC) fields.

Rate of errored H.223 MUX PDUs: The rate of erroneous MUX PDUs at the H.223 multiplex layer. "Erroneous" means that the header is corrupted such that it is impossible to determine which logical channel the MUX PDU belongs to. (Without applying options, CRC is calculated for the header of the frames only.)

Audio or Video AL Frame Error Rate: The rate of invalid (erroneous) adaptation layer PDUs. An invalid AL-PDU is one which: (a) has fewer than the possible minimum number of octets, (b) does not contain an integral number of octets, (c) is longer than the maximum AL-PDU size; or (d) contains a CRC error.

Approximated Video BLER: To judge whether the picture quality was good, the block error rate (BLER) is a useful performance indicator. To approximate the loss rate of the 80 octets long video blocks, a combined measure from the 'Rate of errored H.223 MUX-PDUs' and 'Audio or Video AL Frame Error Rate' is needed.

Since in practice typically a H.223 MUX-PDU contains bits belonging to only an audio or only a video channel, one possible approach to decide whether an errored H.223 MUX-PDU contained video is the following:

Since audio frames arrive periodically (with a slight jitter), and the average stuffing rate can also be approximated, it is possible to decide with good likelihood whether an errored H.223 MUX-PDU contained an audio frame or stuffing bits. If not, we can suspect that it was a video frame. If this "suspected" additional video error is added to the 'Video AL Frame Error Rate', then we obtain a better approximation of the rate of the errored video frames as seen by the user.

Video Bitrate: The average number of bits of adaptation layer video SDUs (video frames) in a second. All overhead and errored bits are excluded.

Audio Bitrate: The average number of bits of adaptation layer audio SDUs (audio frames) in a second. All overhead and errored bits are excluded.

Audio Frame Loss Rate: The rate of lost audio frames. The audio information is transmitted with a constant frame rate (i.e., periodically). This enables to detect audio frame loss.

H.245 NSRP Retransmission Rate: The number of retransmitted H.245 messages divided by the number of all H.245 messages. Retransmissions occur when a message was not acknowledged or acknowledged after the retransmission timer expired.

H.245 Average Response Time: The average time elapsed between H.245 request and response messages.

The following measures can be obtained using the traffic monitor:

Service Access Rate: The average number of L3 Call Setup messages indicating H.223 & H.245 video transmission in a second.

Duration of Successful Calls: The average time elapsed between the appearance of the L3 CONACK (connection acknowledgment) and the L3 DISC (disconnect) messages in case of successfully set up and normally terminated (terminated by the user) calls.

H.245 Duration: The average time elapsed from the first H.245 message detected on LCNO till the H.245 EndSession command.

The procedure for calculating the above listed Key Performance Indicators and usage measures is as follows:

First the next call record from the traffic database is read. Then this call is checked whether it is of the type, which the Key Performance Indicator is about. After that the quantity defined by the Key Performance Indicator for the particular call is calculated. Next the statistical function is updated with the value (e.g., add the value to an aggregation counter), and the counter calculating the number of eligible calls for the Key Performance Indicator is increased. Previous steps are repeated until all the calls are processed. Finally, the Key Performance Indicator value by evaluating the statistical function that is relevant for the Key Performance Indicator is calculated. E.g., if the Key Performance Indicator is an average value, the value of the aggregation counter is divided with the count of the eligible calls.

Although preferred embodiments of the present invention have been illustrated in the accompanying drawings and described in the foregoing detailed description, it is understood that the invention is not limited to the embodiments disclosed, but is capable of numerous rearrangements, modifications, and substitutions without departing from the spirit of the invention as set forth and defined by the following claims.

What is claimed is:

1. A method for performance analysis at a passive traffic monitor of a circuit switched mobile telecommunications network, wherein the passive traffic monitor is connected to a standardized interface of the network, the method comprising the steps of:

determining transport channels carrying the circuit switched traffic of an analyzed service;

demultiplexing bit-streams of the circuit switched traffic;

building a traffic database;

defining Key Performance Indicators and usage measures of the service; and calculating Key Performance Indicators and usage measures.

2. The method of claim 1, further comprising the steps of:

capturing raw traffic traces over the standardized interface;

providing each captured packet or frame with a time-stamp;

parsing the raw traffic traces and extracting and correlating information needed to find circuit switched calls.

3. The method of claim 1, further comprising:

time-stamping each arriving packet or frame; and extracting and correlating information needed to find circuit switched calls.

4. The method of claim 2, wherein the standardized interface is the Iu interface of a 3G network.

5. The method of claim 4, wherein the process of parsing the raw traffic traces and extracting and correlating information needed to find circuit switched calls comprise the steps of:

finding the SCCP Connection Request and Connection Confirm messages from the lu Control Plane Signaling Messages;

obtaining Destination Local Reference and Source Local Reference;

finding the Layer 3 call SETUP message;

deciding whether the call is a 3G-324M videophone call;

finding RANAP RAB Assignment message;

identifying Binding ID; and identifying the transport connection.

6. The method of claim 2 further comprising:

identifying a call setup signaling messages corresponding to a videophone call;

obtaining transport network level identifiers of the connection carrying the videophone traffic of the respective subscriber;

demultiplexing the transport network connection;

reconstructing a H.223 flow;

obtaining parameters of logical channels carrying the video and voice components by interpreting the H.245 control messages;

reconstructing the video and audio flows;

calculating Key Performance Indicators are calculated;

depending on what information is needed, distinguishing Call Key Performance Indicators, H.223 Key Performance Indicators, H.245 Key Performance Indicators, Audio and Video Key Performance Indicators and Combined Key Performance Indicators.

7. The method of claim 4 wherein the step of defining Key Performance Indicators is a process of defining a Service Set-Up Success Rate Video Telephony, which indicates the number of 3G-324M successful Video Telephony call setups divided by the number of all 3G-324M Video Telephony call setups.

8. The method of claim 4 wherein the step of defining Key Performance Indicators is a process of defining a Dropped Video Telephony Call Rate, which indicates the number of 3G-324M Video Telephony calls that are successfully set up but did not finish properly divided by the number of 3G-324M Video Telephony calls that are successfully set up.

9. The method of claim 4 wherein the step of defining Key Performance Indicators is a process of defining a Service Access Time, which indicates the average time between the SCCP CR and the appearance of the first video frame within the H.223 bit-stream calculated for 3G-324M Video Telephony calls that are successfully set up.

10. The method of claim 4 wherein the step of defining Key Performance Indicators is a process of defining a Corrected Service Access Time, which indicates the average of the time between the SCOP CR and the appearance of the first video frame within the H.223 bit-stream minus the time between the L3 ALERTING and L3 CONNECT messages, calculated for 3G-324M Video Telephony calls that are successfully set up.

11. The method of claim 4 wherein the step of defining Key Performance Indicators is a process of defining a Channel Setup Time, which indicates the average time elapsed from the arrival of the first H.223 frame until the arrival of the first video frame for 3G-324M Video Telephony calls that are successfully set up.

12. The method of claim 4 wherein the step of defining Key Performance Indicators is a process of defining a H.223 MUX Overhead, which indicates the percent of redundant octets within the H.223 multiplex containing the header and CRC fields.

13. The method of claim 4 wherein the step of defining Key Performance Indicators is a process of defining a Rate of errored H.223 MUX PDUs, which indicates the rate of erroneous MUX PDUs at the H.223 multiplex layer.

14. The method of claim 4 wherein the step of defining Key Performance Indicators is a process of defining an Audio or Video AL Frame Error Rate, which indicates the rate of invalid (erroneous) adaptation layer PDUs.

15. The method of claim 4 wherein the step of defining Key Performance Indicators is a process of defining an Approximated Video Block Error Rate, which indicates whether the picture quality was good.

16. The method of claim 4 wherein the step of defining Key Performance Indicators is a process of defining a Video Bitrate, which indicates the average number of bits of adaptation layer video SDUs (video frames) in a second excluded all overhead and errored bits.

17. The method of claim 4 wherein the step of defining Key Performance Indicators is a process of defining an Audio Bitrate, which indicates the average number of bits of adaptation layer audio SDUs (audio frames) in a second excluded all overhead and errored bits.

18. The method of claim 4 wherein the step of defining Key Performance Indicators is a process of defining an Audio Frame Loss Rate, which indicates the rate of lost audio frames.

19. The method of claim 4 wherein the step of defining Key Performance Indicators is a process of defining an H.245 NSRP Retransmission Rate, which indicates the number of retransmitted H.245 messages divided by the number of all H.245 messages.

20. The method of claim 4 wherein the step of defining Key Performance Indicators is a process of defining an H.245 Average Response Time, which indicates the average time elapsed between H.245 request and response messages.

21. The method of claim 4 wherein the step of defining usage measures is a process of defining a Service Access Rate, which indicates the average number of L3 Call Setup messages presenting H.223&H.245 video transmission in a second.

22. The method of claim 4 wherein the step of defining usage measures is a process of defining a Duration of Successful Calls, which indicates the average time elapsed between the appearance of the L3 CONACK and the L3 DISC messages in case of successfully set up and normally terminated calls.

23. The method of claim 4 wherein the step of defining usage measures is a process of defining a H.245 Duration, which indicates the average time elapsed from the first H.245 message detected on LCNO till the H.245 EndSession command.

24. The method of claim 4 wherein the step of calculating Key Performance Indicators and usage measures comprises the steps of:

reading the next call record from the traffic database;

checking whether this call is of the type, which the Key Performance Indicator is about;

calculating the quantity defined by the Key Performance Indicator for the particular call;

updating the statistical function with the value and increasing the counter calculating the number of eligible calls for the Key Performance Indicator;

repeating the steps above until all the calls are processed; and calculating the Key Performance Indicator value by evaluating the statistical function that is relevant for the Key Performance Indicator.

* * * * *